United States Patent [19]
Ujikawa et al.

[11] 4,394,480
[45] Jul. 19, 1983

[54] LOW SHRINKAGE UNSATURATED POLYESTER RESIN COMPOSITION

[75] Inventors: Norihisa Ujikawa; Kyosuke Fukushi, both of Aichi, Japan

[73] Assignee: Nippon Oil and Fats Co., Ltd., Tokyo, Japan

[21] Appl. No.: 361,168

[22] Filed: Mar. 24, 1982

[30] Foreign Application Priority Data

Apr. 1, 1981 [JP] Japan ................................. 56-048769

[51] Int. Cl.$^3$ ............................................. C08L 67/06
[52] U.S. Cl. ....................................... 525/43; 525/445
[58] Field of Search .......................... 525/43, 444, 445

[56] References Cited

U.S. PATENT DOCUMENTS

| | | | |
|---|---|---|---|
| 3,721,642 | 3/1973 | Schalin | 525/445 |
| 3,725,335 | 4/1973 | Lefebre | 525/445 |
| 4,048,257 | 9/1977 | Stevenson | 525/43 |
| 4,245,068 | 1/1981 | Brewbaker | 525/445 |
| 4,251,641 | 2/1981 | Arakawa | 525/445 |
| 4,283,512 | 8/1981 | Matsushima | 525/445 |
| 4,309,519 | 1/1982 | Obara | 525/43 |

FOREIGN PATENT DOCUMENTS 2305246  6/1973  Fed. Rep. of Germany ...... 525/445

*Primary Examiner*—Allan Lieberman
*Assistant Examiner*—Patricia Short
*Attorney, Agent, or Firm*—Flynn, Thiel, Boutell & Tanis

[57] ABSTRACT

An unsaturated polyester resin composition comprising an unsaturated polyester resin, a polymerizable monomer and a mixture of block copolymers having acid groups prepared by first copolymerizing in a first copolymerization reaction a polymeric peroxide with a monomer A or B, or with an unsaturated acid together with monomer A or B, thereby obtaining a copolymer having peroxy bonds in the molecule thereof, which copolymer is further copolymerized in the second copolymerization reaction with each of monomers A or B or the unsaturated acid which were excluded in the first copolymerization reaction to give the block copolymer mixture, which composition shows no segregation of the low shrinkage agent on thickening by a thickener and the said composition gives cured moldings of reduced shrinkage which are excellent in many characteristics.

Monomer A: a vinyl acetate or a mixture of vinyl acetate and one or more monomers which are copolymerizable with vinyl acetate Monomer B: styrene series monomers, unsaturated organic acids, anhydrides, or acid esters, or mixtures thereof 16 Claims, No Drawings

LOW SHRINKAGE UNSATURATED POLYESTER RESIN COMPOSITION

BACKGROUND OF THE INVENTION

1. Field of the Invention

This invention relates to a low shrinkage unsaturated polyester resin composition which shows a low shrinkage and is excellent in colouring characteristics, surface smoothness and physical strength.

Recently the demand for sheet molding compounds (hereinafter referred to as SMC), bulk molding compounds (hereinafter referred to as BMC) and the like, which are produced by blending a filler, a pigment, a thickener, a fibrous reinforcing material, a curing agent, a stabilizer, a mold releasing agent and the like with an unsaturated polyester resin, as industrial materials for machine molding, has remarkably increased because they fulfil needs for saving manpower, effecting mass production, improving working environment and the like in the industry of processing reinforced plastics.

However, unsaturated polyester resins show a large shrinkage when they are cured and thus the resulting moldings tend to have cracks, looseness, warps, waves and the like.

In addition, the shrinkage upon curing causes embossments of reinforcing materials and peeling at the interface.

Furthermore, moldings of high dimensional precision can hardly be produced as the result of the shrinkage.

A method is adopted in general for improving these drawbacks in which a thermoplastic resin such as polystyrene, polyvinyl acetate, polymethyl methacrylate or the like is blended as a low shrinkage agent with the unsaturated polyester resin.

However, there are drawbacks in the conventional low shrinkage unsaturated polyester resin compositions which are prepared by blending the low shrinkage unsaturated polyester resin with the filler, the pigment, the thickener, the fibrous reinforcing agent, the curing agent, the stabilizer, the mold releasing agent and the like, these drawbacks being that the low shrinkage agent segregates upon thickening by the thickener and during storage resulting in contamination of the mold and spoiling of the surface conditions, that little effect is exerted for reducing the shrinkage, and that uniform colouring is hardly attained. As an improvement to overcome these drawbacks, there is described an unsaturated polyester resin composition, for example, in Japanese unexamined Patent Application Publication No. 28589/1977 which contains 20 to 80% by weight of an α,β- ethylenically unsaturated polyester having a molecular weight of 220 to 350 based on one double bond and using at least 10% by mole of neopentyl glycol, hydrogenated bisphenol A, 2,2'-di-(4-hydroxypropoxyphenyl) propane or 2,2'-di-(4-hydroxyethoxyphenyl) propane based on the glycol component of the unsaturated polyester resin; 20 to 80% by weight of an ethylenically unsaturated monomer; and 1 to 25% by weight of a styrene series copolymer having an acid value of 3 to 40. On the other hand, there is shown in Japanese Laid-Open Patent Application Publication No. 44896/1977 a low shrinkage molding material which is prepared by compounding 100 parts by weight of an unsaturated polyester resin composed of 20 to 80 parts by weight of an unsaturated polyester and 80 to 20 parts by weight of ethylenically unsaturated monomer; 2 to 20 parts by weight of a copolymer containing carboxyl groups which copolymer is derived from (A) 2 to 15 parts by weight of polystyrene and (B) ethylene used in an amount of 70 to 98% by mole based on the total amount of the monomers; and 30 to 300 parts by weight of a filler.

However, these compositions or molding materials do not fulfill all the requirements of low shrinkage, coloring characteristics, surface smoothness and physical strength.

SUMMARY OF THE INVENTION

An object of this invention is to provide a low shrinkage unsaturated polyester resin composition which can give low shrinkage cured moldings. Another object of this invention is to provide a low shrinkage unsaturated polyester resin composition which can give low shrinkage cured moldings which are excellent in uniform coloring characteristics, surface smoothness and physical strength. A further object of this invention is to provide a process for producing a low shrinkage unsaturated polyester resin composition which can give cured moldings excellent in uniform coloring characteristics, surface smoothness and physical strength. Other objects will be apparent in the following descriptions.

DETAILED EXPLANATION OF THE INVENTION

This invention is based on the findings that a composition produced by compounding an unsaturated polyester resin and a block copolymer mixture prepared by first copolymerizing, in a first copolymerization reaction, a polymeric peroxide explained below with monomer A or B, each of which is also explained below, or with an unsaturated acid together with monomer A or B, to give a copolymer having peroxy bonds in the molecule, which copolymer is further copolymerized in the second copolymerization reaction with one of monomer A or B or the unsaturated acid together with monomer A or B which was excluded in the first copolymerization reaction to give a block copolymer mixture. This mixture shows no segregation of the low shrinkage agent on thickening by a thickener and during storage, and the composition gives cured moldings of reduced shrinkage which are excellent in coloring characteristics, surface smoothness and physical strength. A further composition produced by compounding the first composition and a filler, a pigment, a thickener, a fibrous reinforcement, a curing agent, a stabilizer, a mold releasing agent and the like also shows no segregation of the low shrinkage agent on thickening as well as during storage, and gives cured moldings of reduced shrinkage which are excellent in coloring characteristics, surface smoothness and physical strength.

The low shrinkage unsaturated polyester resin composition of this invention is characterized in that the unsaturated polyester resin composition comprises (a) 20 to 70% by weight of an unsaturated polyester resin (hereinafter referred to as component (a)); (b) 20 to 70% by weight of a polymerizable monomer (hereinafter referred to as component (b)); and (c) 1 to 20% by weight of a block copolymer mixture having acid groups defined hereinbelow (hereinafter referred to as component (c)), and that a mixture of component (a), component (b) and component (c) is in a non-aqueous dispersion, and that a mixture of component (b) and component (c) is in a non-aqueous dispersion.

Block Copolymer Mixture Having Acid Groups: said mixture is a mixture of block copolymers produced by first copolymerizing, in a first polymerization reaction, a polymeric peroxide shown in the below-described general formula (1) and either one of monomers herein below defined as monomer A and monomer B to give a first polymerization reaction product having peroxy bonds in the molecule thereof, which product is further copolymerized, in a second polymerization reaction, with an unsaturated acid and either monomer A or monomer B, whichever monomer was excluded from the first polymerization reaction, to give the block copolymers. Alternatively the block copolymer mixture is produced by copolymerizing, in the first copolymerization reaction, the above-stated unsaturated acid and either monomer A or monomer B to give a first copolymerization reaction product having peroxy bonds in the molecule, which product is further copolymerized, in the second polymerization reaction, with either monomer A or monomer B, whichever monomer was excluded from the first polymerization reaction, to give the block copolymers.

In addition, the unsaturated acid is used in the first or second copolymerization reaction so as to give the final block copolymers having acid groups, an acid value of 0.5 to 20. Furthermore, monomer A is in an amount of 90 to 10% by weight based on the sum of the amounts of monomers A and B.

The polymeric peroxide:

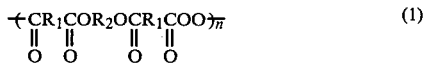

In the formula (1), $R_1$ is an alkylene or substituted alkylene group having a carbon number of 1 to 18, a cycloalkylene or substituted cycloalkylene group having a carbon number of 3 to 15, or a phenylene or substituted phenylene group; $R_2$ is an alkylene or substituted alkylene group having a carbon number of 2 to 10, a

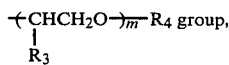

$R_3$ being a hydrogen atom or a methyl group, $R_4$ being an alkylene group or substituted alkylene group having a carbon number of 2 to 10 and m being an integer of 1 to 13, a

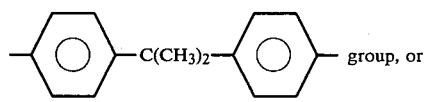

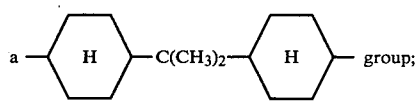

and n is a number of 2 to 20.

Monomer A: Monomer A means vinyl acetate or a mixture of not less than 70% by weight of vinyl acetate and not more than 30% by weight of a monomer or monomers which are copolymerizable with vinyl acetate.

Monomer B: A monomer or a mixture of monomers consisting of 0 to 100% by weight of a styrene series monomer or monomers and 100 to 0% by weight of an unsaturated organic acid ester or acid esters.

The unsaturated polyester resin used for the production of the composition of this invention is prepared from an $\alpha,\beta$-unsaturated dibasic acid, anhydride, or ester, a saturated dibasic acid, anhydride, or ester, and a glycol. The $\alpha,\beta$-unsaturated dibasic acid, anhydride, or ester includes herein, for example, maleic anhydride, maleic acid, fumaric acid, mesaconic acid, citraconic acid, itaconic acid, a chlorinated maleic acid and their alkyl esters. The saturated dibasic acid, anhydride, or ester includes, for example, phthalic anhydride, phthalic acid, isophthalic acid, tetraphthalic acid, tetrahydrophthalic acid, a halogenated phthalic anhydride, adipic acid, succinic acid, sebacic acid and their alkyl esters. The glycol includes, for example, ethylene glycol, diethylene glycol, propylene glycol, dipropylene glycol, butylene glycol, neopentyl glycol, hexylene glycol, hydrogenated bisphenol A, 2,2'-di(4-hydroxypropoxyphenyl) propane, 2,2'-di(4-hydroxyethoxyphenyl) propane, ethylene oxide, propylene oxide and the like.

As the polymerizable monomer used for the preparation of the composition of this invention, styrene series monomers such as styrene, vinyl toluene, $\alpha$-methyl styrene, t-butyl styrene, and chlorostyrenes; diallyl phthalate, vinyl acetate, acrylic acid esters and methacrylic acid esters can be exemplified. Among the polymerizable monomers, styrene series monomers are especially preferable.

As the monomer copolymerizable with vinyl acetate, which is used for the production of the block copolymer mixture having acid groups of this invention, ethylene, vinyl chloride, vinylidene chloride, vinyl esters and allyl esters can be exemplified.

As the styrene series monomer used for the production of the block copolymer mixture having acid groups which is used for the production of the composition of this invention, styrene, vinyl toluene, $\alpha$-methyl styrene, t-butyl styrene, a chlorostyrene and the like can be exemplified.

As the unsaturated organic acid ester used for the production of the block copolymer mixture having acid groups which is used for the production of the composition of this invention, methyl acrylate, ethyl acrylate, butyl acrylate, methyl methacrylate, ethyl methacrylate, propyl methacrylate, butyl methacrylate, hexyl methacrylate, 2-ethylbutyl methacrylate, octyl methacrylate, lauryl methacrylate, 2-ethylhexyl methacrylate and the like can be exemplified.

As the unsaturated acid used for the production of the block copolymer mixture which is used for the production of the composition of this invention, acrylic acid, methacrylic acid, maleic anhydride, maleic acid hemiesters, itaconic acid and the like can be exemplified.

The block copolymer mixture having acid groups used for the production of the composition of this invention can be easily produced by the polymerization using the polymeric peroxide shown in general formula (1) according to a known production process including a conventional block-, suspension-, emulsion- or solution- polymerization process.

In this case, the copolymer mixture having peroxy bonds in the molecules thereof, which is formed in the first polymerization reaction, may be separated from the reaction system as an intermediate to serve as the starting material for the block copolymer mixture in the next step, or it may be successively subjected to the block copolymerization without isolation. It is proper to use the polymeric peroxide in an amount of 0.1 to 10 parts based on 100 parts of the above-stated monomer A or monomer B. It is also proper to adopt a reaction temperature of 40° to 90° C. and a reaction time of 2 to 15 hours. The polymeric peroxide used for the production of the block copolymer mixture having acid groups which is used for the production of the composition of this invention can be easily prepared by reacting a dibasic acid chloride having an ester bond in the molecule and sodium peroxide according to a conventional process for producing a diacyl peroxide.

The polymeric peroxide shown in general formula (1) which is used for the production of the composition of this invention, for example, can be one of the following:

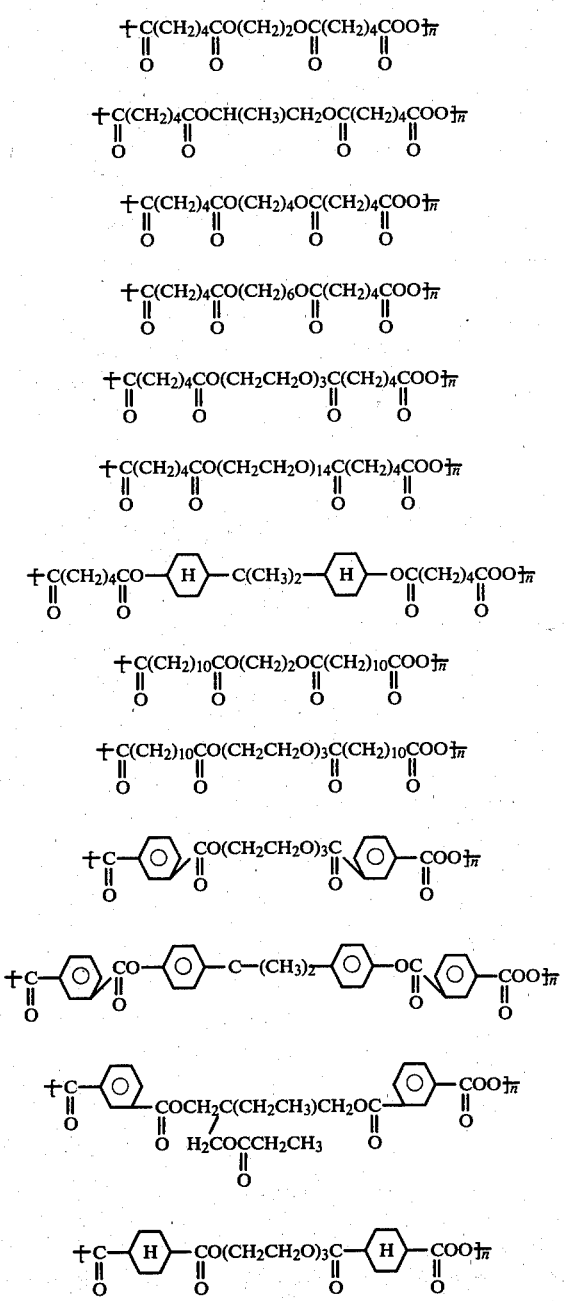

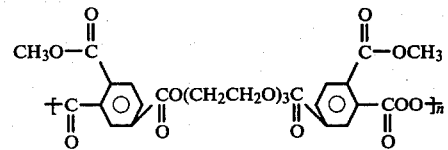

-continued

In the above formulae, n is a number of 2 to 20.

In the composition of this invention, it is necessary to use the block copolymer mixture in an amount of 1 to 20%.

An amount less than 1% hardly effects the reduction of shrinkage, while more than 20% affects the cured products by lowering their physical strength.

It is preferable that the block copolymer mixture having acid groups used for the production of the composition of this invention has an acid value of 0.5 to 20. A block copolymer mixture having an acid value beyond the range of 0.5 to 20 gives cured products which are inferior in uniform coloring characteristics. In the production of the composition of this invention, the block copolymer mixture having acid groups can be used by first being admixed with the polymerizable monomer and then added into the unsaturated polyester or a mixture of the unsaturated polyester and the polymerizable monomer. Alternatively, the block copolymer mixture having acid groups can be used by directly by admixing it with a mixture of the unsaturated polyester and the polymerizable monomer.

The mixture used for the production of the composition of this invention which consists of the polymerizable monomer and the block copolymers is in a nonaqueous dispersed state, and further the mixture of the unsaturated polyester, polymerizable monomer and the block copolymer having acid groups is also in a nonaqueous dispersed state. The low shrinkage unsaturated polyester resin composition of this invention can be used as SMC or BMC in a conventional way, for example, after the composition is compounded with optionally selected curing agent, filler, pigment, thickener, fibrous reinforcing agent, stabilizer, mold releasing agent, flame retarder and the like.

Cured products of reduced shrinkage which are excellent in uniform coloring characteristics, surface smoothness and physical strength can be obtained by the use of the thus produced low shrinkage unsaturated polyester resin composition.

This invention is further explained in detail in the following working Examples, Reference Examples and Comparative Tests.

In the Examples and Tests, the expression of parts and % shall mean parts by weight and % by weight except when otherwise stated expressly.

REFERENCE EXAMPLE 1

$$\left[ \text{Production of } \begin{array}{c} +C+CH_2)_4CO(CH_2CH_2O)_3C(CH_2)_4COO_{7n} \\ \parallel \quad \parallel \quad \parallel \quad \parallel \\ O \quad O \quad O \quad O \end{array} \right]$$

Into a reaction vessel made of glass which was provided with a thermometer and a stirrer, there were charged 183 parts of adipoyl chloride and 75 parts of triethylene glycol.

The mixture was reacted for 60 minutes, while the reaction temperature of 20° to 30° C. and the pressure of 40 to 50 mm Hg were maintained. Triethylene glycol bis(adipoyl chloride) was obtained as a colorless viscous liquid in an amount of 220 parts.

After the preparation, an aqueous solution of sodium peroxide, which was prepared in advance from 30 parts of a 50% aqueous solution of hydrogen peroxide and 832 parts of a 5% aqueous solution of sodium hydroxide, was charged into a reaction vessel made of glass which was provided with a thermometer, a stirrer and a dropping funnel. Then, 176 parts of triethylene glycol bis(adipoyl chloride) which were prepared in the above reaction were added from the dropping funnel, while the reaction temperature was maintained at 0° to 5° C. under stirring. After the completion of the addition, the stirring was further continued for 30 minutes while the temperature was kept at 0° to 5° C. to complete the reaction. The resultant solid precipitate was filtered, washed twice with water and vacuum dried to give 140 parts of white solids.

The white solids were dissolved in 360 parts of chloroform which were poured into 1600 parts of methanol to effect the purification by recrystallization. Filtration of the purification product gave 108 parts of white solid.

Purity was measured by the iodine titration as to this white solid. Decomposition temperature and the molecular weight were also measured. Infra-red absorption spectroscopic analysis and nuclear magnetic resonance spectrum analysis were further carried out. Results are shown below.

From these results it was confirmed that the white solid was a polymeric peroxide having the formula

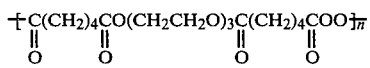

The molecular weight was measured by a molecular weight measuring apparatus (Model VPO 115 made by Hitachi Ltd) utilizing gas pressure equilibrium techniques.
Purity measured by the iodine titration; 99.7%
Decomposition Temperature; 90° C.
Molecular weight; 2140 (n=5.3)
Infra-Red Absorption Spectrum;
 1725 cm$^{-1}$(C=O bond of esters)
 1780 cm$^{-1}$ and 1805 cm$^{-1}$(C=O bond of diacyl groups) 875 cm$^{-1}$(O—O bond)
Nuclear Magnetic Resonance Spectrum;

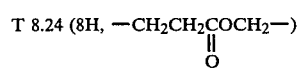

-continued

T 7.56 (8H, —CH$_2$CH$_2$COCH$_2$—)

T 5.72 (4H, —CH$_2$COCH$_2$CH$_2$—)

REFERENCE EXAMPLE 2

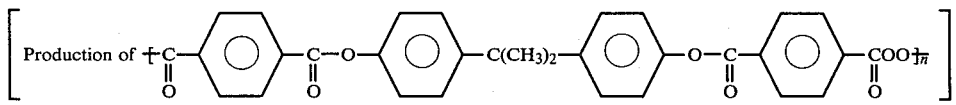

Into a reaction vessel made of glass which was provided with a thermometer and a stirrer, there were charged 406 parts of isophthaloyl chloride, 228 parts of 2,2′-di(4-hydroxyphenyl)propane and 1500 parts of toluene.

The content of the reaction vessel underwent reaction at a reaction temperature of 70° to 75° C. for 2 hours while introducing nitrogen gas therein, thereby obtaining 2020 parts of a toluene solution of 2,2′-di-(4-hydroxyphenyl)propane-bis(iso-phthaloyl chloride) as a colorless liquid.

The content of the acid chloride was 27.5% in the liquid.

Subsequently, the resultant product was subjected to the same procedures as described in the production and purification procedures of Reference Example 1, thereby obtaining 325 parts of a white solid. Measurement of several characteristics as well as analysis were carried out as to the thus resulting white solid in the same way as in Reference Example 1, which gave the following results.

It was confirmed from the results that the white solid was a polymeric peroxide shown by the general formula

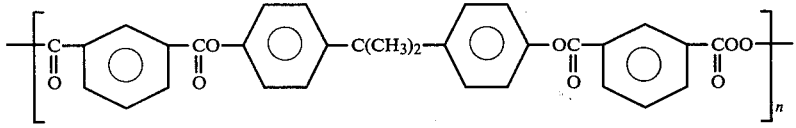

Purity measured by the iodine titration; 97.5%
Decomposition temperature; 120° C.
Molecular weight; 1829 (n=3.5)
Infra-Red Absorption Spectrum;
 1720 cm$^{-1}$(C=O bond of esters)
 1770 cm$^{-1}$ and 1790 cm$^{-1}$(C=O bond of diacyl groups)
 865 cm$^{-1}$(O—O bond)

REFERENCE EXAMPLE 3

[Illustration No. 1 for the Production of a Block Copolymer Mixture Having Acid Groups]

Into a reaction vessel made of glass which was provided with a thermometer, a stirrer and a condenser, there were charged 300 parts of a 1.0% aqueous solution of polyvinyl alcohol and a solution prepared in advance by dissolving 0.5 parts of the polymeric peroxide obtained in Reference Example 1 into 10 parts of vinyl acetate.

After the air was replaced by nitrogen in the reaction vessel, polymerization (the first copolymerization reaction) was initiated by heating the reaction system to 60° C. with stirring. The reaction was carried out for 3 hours, while the temperature was maintained at 60° C. and then a mixture of 90 parts of styrene and 10 parts of methacrylic acid was added. Subsequent to this, the temperature was raised to 75° C. to continue a further polymerization (the second copolymerization reaction) for 7 hours. After the reaction system was cooled to room temperature, the polymerization product was filtered and washed well with water, followed by vacuum drying which gave 103 parts of a block copolymer mixture having acid groups in the form of white granules.

REFERENCE EXAMPLE 4

[Illustration No. 2 for the Production of a Block Copolymer Mixture Having Acid Groups]

A block copolymer mixture having acid groups was obtained in an amount of 102 parts in polymerization reactions which were carried out in the same way as in Reference Example 3 except for using a mixture of 90 parts of styrene and 4.7 parts of methacrylic acid instead of the mixture of 90 parts of styrene and 10 parts of methacrylic acid in the second copolymerization reaction.

REFERENCE EXAMPLE 5

[Illustration No. 3 for the Production of a Block Copolymer Mixture Having Acid Groups]

A block copolymer mixture having acid groups was obtained in an amount of 100 parts in polymerization reactions which were carried out in the same way as in Reference Example 3 except for using a mixture of 90 parts of styrene and 3 parts of methacrylic acid in the second copolymerization reaction.

REFERENCE EXAMPLE 6

[Illustration No. 4 for the Production of a Block Copolymer Mixture Having Acid Groups]

A block copolymer mixture having acid groups was obtained in an amount of 97 parts in polymerization reactions which were carried out in the same way as in Reference Example 3 except for using a mixture of 90 parts of styrene and 1.5 parts of methacrylic acid in the second copolymerization reaction.

REFERENCE EXAMPLE 7

[Illustration No. 5 for the Production of a Block Copolymer Mixture Having Acid Groups]

A block copolymer mixture having acid groups was obtained in an amount of 96.5 parts in polymerization reactions which were carried out in the same way as in Reference Example 3 except for using a mixture of 90 parts of styrene and 0.8 part of methacrylic acid in the second copolymerization reaction.

REFERENCE EXAMPLE 8

[Illustration No. 6 for the Production of a Block Copolymer Mixture Having Acid Groups]

A block copolymer mixture having acid groups was obtained in an amount of 98 parts in polymerization reactions which were carried out in the same way as in Reference Example 3 except for using in the first copolymerization reaction a solution prepared in advance by dissolving 2.5 parts of the polymeric peroxide obtained in Reference Example 1 into 50 parts of vinyl acetate and also except for using in the second copolymerization reaction a mixture of 50 parts of styrene and 1.5 parts of methacrylic acid.

REFERENCE EXAMPLE 9

[Illustration No. 7 for the Production of A Block Copolymer Mixture Having Acid Groups]

A block copolymer mixture having acid groups was obtained in an amount of 97 parts in polymerization reactions which were carried out in the same way as in Reference Example 3 except for using in the first copolymerization reaction a solution prepared in advance by dissolving 4.5 parts of the polymeric peroxide obtained in Reference Example 1 into 90 parts of vinyl acetate and also using a mixture of 10 parts of styrene and 1.5 parts of methacrylic acid.

REFERENCE EXAMPLE 10

[Illustration No. 8 for the Production of a Block Copolymer Mixture Having Acid Groups]

A block copolymer mixture having acid groups was obtained in an amount of 95 parts in polymerization reactions which were carried out in the same way as in Reference Example 6 except for using in the first copolymerization reaction a solution prepared in advance by dissolving 0.75 part of the polymeric peroxide obtained in Reference Example 2 into 10 parts of vinyl acetate.

REFERENCE EXAMPLE 11

[Illustration No. 9 for the Production of a Block Copolymer Mixture Having Acid Groups]

A block copolymer mixture having acid groups was obtained in an amount of 96 parts in polymerization reactions which were carried out in the same way as in Reference Example 3 except for using in the first copolymerization reaction a solution prepared in advance by dissolving 0.5 part of the polymeric peroxide obtained in Reference Example 1 into a mixture of 10 parts of vinyl acetate and 3 parts of methacrylic acid and except for using in the second polymerization 90 parts of styrene.

REFERENCE EXAMPLE 12

[Illustration No. 10 for the Production of a Block Copolymer Mixture Having Acid Groups]

A block copolymer mixture having acid groups was obtained in an amount of 99 parts in polymerization reactions which were carried out in the same way as in Reference Example 3 except for using a mixture of 90 parts of styrene and 2.5 parts of acrylic acid in the second copolymerization reaction.

REFERENCE EXAMPLE 13

[Illustration No. 11 for the Production of a Block Copolymer Mixture Having Acid Groups]

A block copolymer mixture having acid groups was obtained in an amount of 100 parts in polymerization reactions which were carried out in the same way as in Reference Example 3 except for using a mixture of 85 parts of styrene, 5 parts of methyl methacrylate and 3 parts of methacrylic acid.

REFERENCE EXAMPLE 14

[Illustration No. 12 for the Production of a Block Copolymer Mixture Having Acid Groups]

Into an autoclave made of stainless steel which was provided with a thermometer and a stirrer, there were charged 300 parts of an 1.0% aqueous solution of polyvinyl alcohol and a solution prepared in advance by dissolving 0.5 part of the polymeric peroxide obtained in Reference Example 1 into 9 parts of vinyl acetate. After the air was discharged from the autoclave, 1 part of vinyl chloride was charged into it.

The polymerization (the first copolymerization reaction) was initiated by heating the reaction system to 60° C. with stirring. The polymerization was carried out for 3 hours, while the temperature was maintained at 60° C. and then a mixture of 90 parts of styrene and 3 parts of methacrylic acid was added into the reaction system. Subsequent to this, the temperature was raised to 75° C. to continue a further polymerization (the second polymerization) for 7 hours. After the reaction system was cooled to room temperature, the polymerization product was filtered and washed well with water, followed by vacuum drying, whereby 99 parts of a mixture of block copolymers having acid groups were obtained as white particles.

REFERENCE EXAMPLE 15

[Illustration No. 13 for the Production of a Block Copolymer Mixture Having Acid Groups]

Into a reaction vessel made of glass which was provided with a thermometer, a stirrer and a condenser, there were charged 300 parts of a 0.2% aqueous solution of polyvinyl alcohol and a solution prepared in advance by dissolving 0.5 part of the polymeric peroxide obtained in Reference Example 1 into 10 parts of vinyl acetate.

After the air was replaced with nitrogen, the polymerization was initiated by heating the reaction system to 60° C. with stirring. The polymerization (the first copolymerization reaction) was carried out for 3 hours, while the reaction temperature was maintained at 60° C. and then a mixture of 90 parts of methyl methacrylate and 4.7 parts of methacrylic acid was added into the reaction system.

Subsequent to this, the temperature was raised to 75° C. to continue a further polymerization (the second copolymerization reaction) for 5 hours. After the reaction system was cooled to room temperature to terminate the polymerization, the polymerization product was filtered and washed well with water, followed by vacuum drying which gave 100 parts of a block copolymer mixture having acid groups as white particles.

REFERENCE EXAMPLE 16

[Illustration No. 14 for the Production of a Block Copolymer Mixture Having Acid Groups]

A block copolymer mixture having acid groups was obtained in an amount of 97 parts in polymerization reactions carried out in the same way as in Reference Example 15, except for using in the first copolymerization reaction a solution prepared by dissolving 4.5 parts of the polymeric peroxide obtained in Reference Example 1 into 90 parts of vinyl acetate and except for using in the second copolymerization reaction a mixture of 10 parts of butyl acrylate and 1.5 parts of methacrylic acid.

REFERENCE EXAMPLE 17

[Illustration No. 15 for the Production of a Block Copolymer Mixture Having Acid Groups]

Into a reaction vessel made of glass which was provided with a thermometer, a stirrer and a condenser, there were charged 300 parts of an 1.0% aqueous solution of polyvinyl alcohol and a solution prepared in advance by dissolving 0.5 parts of the polymeric peroxide obtained in Reference Example 1 into 10 parts of methyl methacrylate.

After the air was replaced by nitrogen gas, the polymerization was initiated by heating the reaction system to 60° C. with stirring. The polymerization was carried out for 3 hours, while the temperature was maintained and then a mixture of 90 parts of vinyl acetate and 4.7 parts of methacrylic acid was added into the reaction system, the temperature of which was subsequently raised to 70° C. to continue a further polymerization for 5 hours. After the reaction system was cooled to room temperature to terminate the polymerization, the polymerization product was filtered and washed well with water, and then vacuum dried, which gave 95 parts of a block copolymer mixture having acid groups as white particles.

REFERENCE EXAMPLE 18

Illustration No. 16 for the Production of a Block Copolymer Mixture Having Acid Groups A block copolymer mixture having acid groups was obtained in an amount of 100 parts in polymerization reactions carried out in the same way as in Reference Example 17, except for using a solution prepared by dissolving 0.5 part of the polymeric peroxide obtained in Reference Example 1 into a mixture of 10 parts of methyl methacrylate and 3 parts of methacrylic acid, instead of the solution of Reference Example 17, which consisted of 10 parts of methyl methacrylate and the polymeric peroxide obtained in Reference Example 1, and also except for using 90 parts of vinyl acetate instead of the mixture of 90 parts of vinyl acetate and 4.7 parts of methacrylic acid which was used in Reference Example 17.

REFERENCE EXAMPLE 19

Production of an Unsaturated Polyester Resin

An unsaturated polyester having an acid value of 30 was synthesized by subjecting 812 parts of fumaric acid, 498 parts of isophthalic acid, 396 parts of propylene glycol and 542 parts of neopentyl glycol to an esterification reaction. The thus resultant unsaturated polyester was diluted by styrene (hereinafter referred to as ST) to result in a ST concentration of 35% based on the amount of the dilution product, thereby obtaining an unsaturated polyester resin (hereinafter referred to as UPR).

EXAMPLES 1~16

Dispersions of the block copolymer mixtures having acid groups were prepared by dispersing the block copolymer mixtures having acid groups therein which were produced in Reference Examples 3 to 18, respectively in ST, and these dispersions were adjusted to have a resin concentration of 30%.

These dispersions were used in Examples 1 to 16 together with the UPR prepared in Reference Example 19 under the below-stated blending conditions to give SMCs which were the unsaturated polyester resin compositions.

UPR—70 Parts
A 30% ST dispersion of the mixture of block copolymers having acid groups—30 Parts
Para-benzoquinone—0.02 Part
Calcium carbonate—100 Parts
Zinc stearate—5 Parts
t-Butyl perbenzoate—1 Part
Magnesium oxide—1 Part
Chopped strand mats (Trade name; EM 450-G-1, made by Japan Glass Fiber Co., Ltd.)—70 Parts
Pigment (Trade name; Polyton Black ND-96, made by Dai Nippon Ink Co., Ltd.)—10 Parts The thus resulting respective SMCs were aged to thicken at 40° C. for 20 hours.

After that, they were compression-molded at 140° C. under the pressure of 100 kg/cm² to give moldings. Physical strength, coefficient of mold shrinkage and surface smoothness were measured as to the thus resulting moldings.

Coloring characteristics were estimated by the direct visual observation. Results are shown in Table 1.

Bending strength and bending modulus of elasticity were measured on the specimens according to JIS-K-6911 (General Methods of Testing Thermosetting Plastics) by using Autograph, Model DSS-5000 made by Shimazu Corporation.

Measuring Method of Coefficient of Mold Shrinkage

Compression-molding was carried out according to JIS-K-6911 (General Methods of Testing Thermosetting Plastics), in which disks having a diameter of 90 mm and a thickness of 11 mm were prepared.

Coefficients of mold shrinkage were calculated from dimensions of the mold and molding products by the following equation.

Coefficient of molding shrinkage =

$$\frac{\begin{pmatrix}\text{Internal dimension}\\ \text{of the mold}\end{pmatrix} - \begin{pmatrix}\text{Actual dimension}\\ \text{of the molding}\end{pmatrix}}{(\text{Internal dimension of the mold})} \times 100\ (\%)$$

[Measuring Method of Surface Smoothness]

TABLE 1

Estimation of compression-molded SMC Properties

| | Low shrinkage agent | | Molding shrinkage (%) | Coloring characteristics*3 | Surface smoothness*4 | Bending characteristics (kg/mm²) | |
|---|---|---|---|---|---|---|---|
| | Species*1 | Acid value*2 | | | | Strength | Modulus of elasticity |
| Example 1 | Reference Example 3 | 15.0 | 0.01 | ○ | ○ | 10.80 | 902.0 |
| Example 2 | Reference Example 4 | 7.6 | −0.04 | ⊙ | ⊙ | 11.50 | 911.1 |
| Example 3 | Reference Example 5 | 6.0 | −0.04 | ⊙ | ⊙ | 11.03 | 905.3 |
| Example 4 | Reference Example 6 | 3.0 | −0.02 | ⊙ | ⊙ | 10.8 | 892.5 |
| Example 5 | Reference Example 7 | 1.0 | −0 | ○ | ○ | 10.1 | 937.8 |
| Example 6 | Reference Example 8 | 2.9 | −0.03 | ⊙ | ⊙ | 11.5 | 910.5 |
| Example 7 | Reference Example 9 | 3.0 | −0.04 | ⊙ | ⊙ | 11.4 | 912.7 |
| Example 8 | Reference Example 10 | 2.9 | −0.02 | ○ | ○ | 10.9 | 897.6 |
| Example 9 | Reference Example 11 | 6.0 | −0.04 | ⊙ | ⊙ | 11.5 | 910.8 |
| Example 10 | Reference Example 12 | 5.9 | −0.04 | ⊙ | ⊙ | 11.1 | 908.6 |
| Example 11 | Reference Example 13 | 6.0 | −0.02 | ⊙ | ○ | 10.9 | 907.2 |
| Example 12 | Reference Example 14 | 6.0 | −0.03 | ○ | ○ | 10.8 | 906.8 |
| Example 13 | Reference Example 15 | 7.5 | 0.02 | ○ | ○ | 10.0 | 905.4 |
| Example 14 | Reference Example 16 | 3.0 | −0.04 | ○ | ○ | 11.0 | 925.3 |
| Example 15 | Reference Example 17 | 7.2 | −0.01 | ○ | ○ | 10.1 | 906.2 |
| Example 16 | Reference Example 18 | 6.0 | −0.02 | ○ | ○ | 10.6 | 905.9 |

*1Numbered Reference Example means a mixture of block copolymer having acid value which was obtained by the listed Reference Example
*2Acid value is entirely that of the resin
*3Coloring characteristic was estimated by observation in 4 grades of ; splendid,⊙; good, △; a little bad and X; bad
*4Surface smoothness was estimated by surface roughness in 3 grades of ; 0 ~ 0.5μ,⊙; 0.5 ~ 1.0μ and △; more than 1.0μ

[Measurement of Physical Strength]

Test specimens were cut from the aforementioned moldings according to Japanese Industrial Standard-K-6911 (Jis-K-6911, General Methods of Testing Thermosetting Plastics).

Surface smoothness was measured by using a Super Tester-11 made by San Yutaka Industry Co., Ltd. to rank 4 grades for the estimation.

Comparative Tests 1 to 3

SMCs were produced in the same way as in Examples 1 to 16 except for using a styrene-methacrylic acid copolymer which was a low shrinkage agent having the acid value as shown in Table 1 and which was produced in a known polymerization process, instead of the block copolymer mixtures having acid groups which were prepared in Examples 1 to 16. The thus resulting SMCs were also compression-molded. The obtained moldings were subjected to the measurement of physical strength, molding shrinkage and surface smoothness in the same way as in Examples 1 to 16. Coloring characteristics were also estimated by the direct visual observation.

The obtained results are shown in Table 2.

COMPARATIVE TEST 4

A SMC was produced in the same way as in Examples 1 to 16 except for using as the low shrinkage agent a product having a trade name of BAKELITE LP-40A which was produced by Union Carbide Corporation, instead of the 30% liquid dispersions of the block copolymer mixture having acid groups.

The thus resulting SMC was also compression-molded. The obtained moldings were subjected to the measurement of physical strength, molding shrinkage and surface smoothness in the same way as in Example 1 to 16. Estimation of coloring characteristics was also carried out.

The obtained results are shown in Table 2.

It is recognized from Tables 1 and 2, that the compression-molded SMC's made of the low shrinkage unsaturated polyester resin compositions of Examples 1~16 are of reduced shrinkage and are excellent in the coloring characteristics, the surface smoothness and the mechanical strength, in comparision with Comparative Tests 1~4.

EXAMPLES 17~20

SMCs were respectively prepared according to the same procedures as those in Examples 1~16 except for employing 100 parts of a mixture comprising admixed 30% ST dispersion of the mixture of block copolymer having acid groups which was obtained in Reference Example 8 (hereinafter referred to as A) and UPR obtained in Reference Example 17, in the mixing ratios by weight as shown in Table 3.

The thus resulting respective SMCs were aged to thicken at 40° C. for 20 hours. After that, they were compression-molded at 140° C. under the pressure of 100 kg/cm$^2$ to form moldings. The resultant moldings were measured as to their physical strength, coefficient of mold shrinkage and surface smoothness, according to the same procedures as those employed in Examples 1~16. Also, their coloring characteristics were estimated. The obtained results are shown in Table 3.

TABLE 2

| | Low Shrinkage agent | | Molding shrinkage (%) | Coloring characteristics*2 | Surface Smoothness*3 | Bending characteristics (kg/mm$^2$) | |
|---|---|---|---|---|---|---|---|
| | Species | Acid value*1 | | | | Strength | Modulus of elasticity |
| Comparative Test 1 | Styrene-methacrylic acid copolymer | 3.0 | 0.04 | ⊕ | Δ | 9.5 | 875.1 |
| Comparative Test 2 | Styrene-methacrylic acid copolymer | 7.5 | 0.03 | ⊕ | Δ | 9.7 | 868.8 |
| Comparative Test 3 | Styrene-methacrylic acid copolymer | 14.5 | 0.04 | Δ | Δ | 9.7 | 870.8 |
| Comparative Test 4 | BAKE-LITE LP-40A | 6.5 | −0.02 | X | Δ | 9.1 | 869.8 |

*1, *2 and *3 The values and the expression for the acid value, the coloring characteristics and the surface smoothness have the same meaning as in Table 1.

TABLE 3

| | Estimation of compression - molded SMC Properties | | | | | |
|---|---|---|---|---|---|---|
| | UPR/A (weight ratio) | Molding shrinkage (%) | Coloring characteristics*1 | Surface smoothness*2 | Bending characteristics (kg/mm$^2$) | |
| | | | | | Strength | Modulus of elasticity |
| Example 17 | 95/5 | 0.02 | ○ | ○ | 10.2 | 902.3 |
| Example 18 | 85/15 | 0.00 | ⊙ | ⊙ | 10.9 | 905.2 |
| Example 19 | 50/50 | −0.04 | ⊙ | ⊙ | 10.9 | 915.0 |
| Example 20 | 40/60 | −0.04 | ○ | ○ | 10.5 | 907.8 |

*1, and *2 The values for the coloring characteristics have the same meaning as in Table 1

The embodiments of the invention in which an exclusive property or privilege is claimed are defined as follows:

1. A low-shrinkage unsaturated polyester resin composition comprising (a) from 20 to 70% by weight of unsaturated polyester resin, (b) from 20 to 70% by weight of a first polymerizable monomer and (c) from 1 to 20% by weight of a block copolymer mixture having acid groups, said block copolymer mixture having been prepared by first copolymerizing (i) a polymeric peroxide having the formula

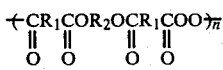

wherein $R_1$ is alkylene or substituted alkylene having 1 to 18 carbon atoms, cycloalkylene or substituted cycloalkylene having 3 to 15 carbon atoms, phenylene or substituted phenylene; $R_2$ is alkylene or substituted alkylene having 2 to 10 carbons atoms,

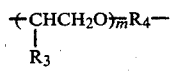

wherein $R_3$ is hydrogen or methyl, $R_4$ is alkylene or substituted alkylene having 2 to 10 carbon atoms and m is an integer of 1 to 13,

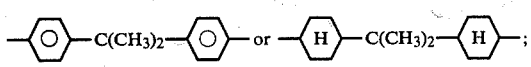

and n is an integer of 2 to 20, with (ii) a second monomer component selected from the group consisting of monomer A, monomer B, mixture of monomer A and an unsaturated organic acid, and mixture of monomer B and an unsaturated organic acid,
wherein monomer A consists of 70 to 100% by weight of vinyl acetate and up to 30% by weight of fourth monomer copolymerizable with vinyl acetate, and monomer B consists of 0 to 100% by weight of one or more styrene series monomers and 0 to 100% by weight of one or more unsaturated organic acid esters,
whereby to obtain a copolymer having peroxy bonds in the molecule, and then block copolymerizing said copolymer having peroxy bonds in the molecule with a third monomer component which is selected from the same group as, but is different from, the said second monomer component that was used in the first copolymerization step, with the provisos that one of said second and third monomer components is a mixture of one of monomer A or monomer B and said unsaturated organic acid and the other of said second and third monomer components is the other of monomer A or monomer B.

2. A composition as claimed in claim 1 wherein the acid value of said mixture of block copolymers having acid groups is 0.5 to 20 and said monomer A is used in an amount of 90 to 10% by weight based on the total amount of said monomers A and B.

3. A composition as claimed in claim 1 or claim 2 in which said first polymerizable monomer is selected from the group consisting of styrene, vinyl toluene, α-methyl styrene, t-butyl styrene, chlorostyrene, diallyl phthalate, vinyl acetate, acrylic acid esters and methacrylic acid esters; said fourth monomer copolymerizable with vinyl acetate is selected from the group consisting of ethylene, vinyl chloride, vinylidene chloride, vinyl esters and allyl esters; said styrene series monomer is selected from the group consisting of styrene, vinyl toluene, α-methyl styrene, t-butyl styrene and chlorostyrene; said unsaturated organic acid ester is selected from the group consisting of methyl acrylate, ethyl acrylate, butyl acrylate, methyl methacrylate, ethyl methacrylate, propylmethacrylate, butyl methacrylate, hexyl methacrylate, 2-ethyl butyl methacrylate, octyl methacrylate, lauryl methacrylate and 2-ethylhexyl methacrylate; and said unsaturated organic acid is selected from the group consisting of acrylic acid, methacrylic acid, maleic anhydride, maleic acid hemiesters and itaconic acid.

4. A composition as claimed in claim 1, wherein said second monomer component consists of monomer A and said third monomer component consists of a mixture of said unsaturated organic acid and monomer B.

5. A composition as claimed in claim 1, wherein said second monomer component consists of a mixture of monomer A and said unsaturated organic acid and said third monomer component consists of monomer B.

6. A composition as claimed in claim 1, wherein said second monomer component consists of monomer B and said third monomer component consists of a mixture of said unsaturated organic acid and monomer A.

7. A composition as claimed in claim 1, wherein said second monomer component consists of a mixture of monomer B and said unsaturated organic acid and said third monomer component consists of monomer A.

8. A composition as claimed in claim 1, wherein said polymeric peroxide is used in an amount of from 0.1 to 10 parts by weight per 100 parts by weight of the monomer A or monomer B contained in said second monomer component.

9. A composition as claimed in claim 8, wherein said first copolymerization is conducted at a temperature in the range of 40° C. to 90° C. for a reaction time of 2 to 15 hours.

10. A composition as claimed in claim 1, wherein said mixture of block copolymers having acid groups is dispersed in said polymerizable monomer (b), and said dispersion is subsequently added to said unsaturated polyester resin (a) to form said composition.

11. A low-shrinkage unsaturated polyester resin composition comprising (a) from 20 to 70% by weight of unsaturated polyester resin, (b) from 20 to 70% by weight of a first polymerizable monomer and (c) from 1 to 20% by weight of a block copolymer mixture having acid groups and having an acid value of from 0.5 to 20, said block copolymer mixture having been prepared by first copolymerizing, at a reaction temperature of from 40° to 90° C. and for a reaction time of from 2 to 15 hours, (i) a polymeric peroxide having the formula

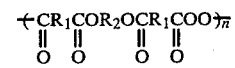

wherein $R_1$ is alkylene or substituted alkylene having 1 to 18 carbon atoms, cycloalkylene or substituted cycloalkylene having 3 to 15 carbon atoms, phenylene or substituted phenylene; $R_2$ is alkylene or substituted alkylene having 2 to 10 carbon atoms,

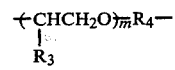

wherein $R_3$ is hydrogen or methyl, $R_4$ is alkylene or substituted alkylene having 2 to 10 carbon atoms and m is an integer of 1 to 13,

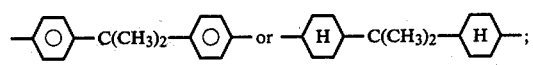

and n is an integer of 2 to 20, with (ii) a second monomer component selected from the group consisting of monomer A, monomer B, mixture of monomer A and an unsaturated organic acid, and mixture of monomer B and an unsaturated organic acid, wherein monomer A consists of 70 to 100% by weight of vinyl acetate and up to 30% by weight of fourth monomer copolymerizable with vinyl acetate, and monomer B consists of 0 to 100% by weight of one or more styrene series monomers and 0 to 100% by weight of one or more unsaturated organic acid esters, the amount of said polymeric peroxide being from 0.1 to 10 parts by weight per 100 parts by weight of the monomer A or monomer B contained in said second monomer component, whereby to obtain a copolymer having peroxy bonds in the molecule, and then block copolymerizing said copolymer having peroxy bonds in the molecule with a third monomer component which is selected from the same group as, but is different from, the said second monomer component that was used in the first copolymerization step, with the provisos that one of said second and third monomer components is a mixture of one of monomer A or monomer B and said unsaturated organic acid, the other of said second and third monomer components is the other of monomer A or monomer B, and the amount of monomer A is from 10 to 90% by weight based on the sum of the amounts of monomer A plus monomer B.

12. A composition as claimed in claim 11 in which said first polymerizable monomer is selected from the group consisting of styrene, vinyl toluene, α-methyl styrene, t-butyl styrene, chlorostyrene, diallyl phthalate, vinyl acetate, acrylic acid esters and methacrylic acid esters; said fourth monomer copolymerizable with vinyl acetate is selected from the group consisting of ethylene, vinyl chloride, vinylidene chloride, vinyl esters and allyl esters; said styrene series monomer is selected from the group consisting of styrene, vinyl toluene, α-methyl styrene, t-butyl styrene and chlorostyrene; said unsaturated organic acid ester is selected from the group consisting of methyl acrylate, ethyl acrylate, butyl acrylate, methyl methacrylate, ethyl methacrylate, propylmethacrylate, butyl methacrylate, hexyl methacrylate, 2-ethyl butyl methacrylate, octyl methacrylate, lauryl methacrylate and 2-ethylhexyl methacrylate; and said unsaturated organic acid is selected from the group consisting of acrylic acid, methacrylic acid, maleic anhydride, maleic acid hemiesters and itaconic acid.

13. A composition as claimed in claim 11, wherein said second monomer component consists of monomer A and said third monomer component consists of a mixture of said unsaturated organic acid and monomer B.

14. A composition as claimed in claim 11, wherein said second monomer component consists of a mixture of monomer A and said unsaturated organic acid and said third monomer component consists of monomer B.

15. A composition as claimed in claim 11, wherein said second monomer component consists of monomer B and said third monomer component consists of a mixture of said unsaturated organic acid and monomer A.

16. A composition as claimed in claim 11, wherein said second monomer component consists of a mixture of monomer B and said unsaturated organic acid and said third monomer component consists of monomer A.

* * * * *